(12) United States Patent  
Bellin et al.

(10) Patent No.: US 9,937,794 B2  
(45) Date of Patent: Apr. 10, 2018

(54) DISPLAY METHOD FOR VEHICLE

(71) Applicant: Volkswagen Aktiengesellschaft, Wolfsburg (DE)

(72) Inventors: Jan Bellin, Hannover (DE); Matthias Breuel, Mannheim (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 218 days.

(21) Appl. No.: 14/665,601

(22) Filed: Mar. 23, 2015

(65) Prior Publication Data  
US 2015/0266379 A1    Sep. 24, 2015

(30) Foreign Application Priority Data  
Mar. 21, 2014   (DE) .................. 10 2014 205 341

(51) Int. Cl.  
*B60K 35/00* (2006.01)  
*B60L 11/18* (2006.01)

(52) U.S. Cl.  
CPC .......... *B60K 35/00* (2013.01); *B60L 11/1861* (2013.01); *B60K 2350/1076* (2013.01); *B60K 2350/1092* (2013.01); *Y02T 10/84* (2013.01)

(58) Field of Classification Search  
CPC . G01C 21/26; G01C 21/3602–21/3617; G01C 21/3673; G01C 21/3679–21/3682; B60K 35/00; B60K 2350/1076; B60K 2350/1092; B60L 11/1861; Y02T 10/84  
See application file for complete search history.

(56) References Cited

U.S. PATENT DOCUMENTS

| | | | | |
|---|---|---|---|---|
| 5,539,399 A | * | 7/1996 | Takahira | G01C 21/3469 340/636.1 |
| 6,570,265 B1 | * | 5/2003 | Shiraishi | B60K 6/26 180/65.235 |
| 6,826,472 B1 | * | 11/2004 | Kamei | G01C 21/3605 340/995.19 |
| 7,055,104 B1 | * | 5/2006 | Billmaier | G06F 3/0481 348/E5.104 |
| 9,008,888 B1 | * | 4/2015 | Gravino | G01C 21/3476 701/26 |
| 9,288,270 B1 | * | 3/2016 | Penilla | H04L 67/125 |

(Continued)

FOREIGN PATENT DOCUMENTS

DE  10 2010 048 258 A1   4/2012  
DE  10 2013 215 012 A1   2/2014

*Primary Examiner* — Courtney D Heinle  
(74) *Attorney, Agent, or Firm* — Muncy, Geissler, Olds & Lowe, P.C.

(57) ABSTRACT

A display method for a vehicle that includes an electric drive and an electric charge accumulator for storing electric energy for the electric drive. Multiple properties of multiple charging stations are provided, which are suitable for charging the electric charge accumulator of the vehicle, and multiple filter criteria are also provided. One particular filter criterion is assigned to one particular property of the multiple properties of the charging stations. The multiple charging stations are filtered, using the multiple filter criteria, for generating a filtered subset of charging stations in such a way that the filtered subset of charging stations has no more than a predetermined number of charging stations. The filtered subset of charging stations is displayed on a display device of the vehicle.

16 Claims, 5 Drawing Sheets

(56) References Cited

U.S. PATENT DOCUMENTS

| | | | |
|---|---|---|---|
| 2002/0138196 A1* | 9/2002 | Polidi | G01C 21/3682 701/409 |
| 2005/0108748 A1* | 5/2005 | Nishikawa | H04N 7/163 725/38 |
| 2006/0149469 A1* | 7/2006 | Amano | G01C 21/3605 701/431 |
| 2009/0114463 A1* | 5/2009 | DeVault | B60K 6/365 180/65.29 |
| 2009/0265099 A1* | 10/2009 | Gottlieb | G01C 21/3697 701/532 |
| 2010/0169008 A1* | 7/2010 | Niwa | B60L 3/12 701/532 |
| 2012/0041673 A1* | 2/2012 | Vandivier | G01C 21/3614 701/426 |
| 2012/0078553 A1* | 3/2012 | Kuroda | B60L 3/0046 702/63 |
| 2012/0109519 A1* | 5/2012 | Uyeki | B60L 7/14 701/439 |
| 2012/0136574 A1* | 5/2012 | Kobayashi | B60L 3/12 701/533 |
| 2012/0179323 A1* | 7/2012 | Profitt-Brown | G01C 21/26 701/29.1 |
| 2013/0073988 A1* | 3/2013 | Groten | G06Q 30/02 715/753 |
| 2013/0218458 A1* | 8/2013 | Scholl | G08G 1/0962 701/426 |
| 2013/0253831 A1* | 9/2013 | Langendorff | G01C 21/3682 701/533 |
| 2014/0046518 A1* | 2/2014 | Roos | B60W 30/182 701/22 |
| 2014/0129139 A1* | 5/2014 | Ellison | G01C 21/3469 701/533 |
| 2014/0142842 A1* | 5/2014 | Knobel | G01C 21/3476 701/410 |
| 2014/0156108 A1* | 6/2014 | Reich | G01C 21/3682 701/1 |
| 2015/0045985 A1* | 2/2015 | Yenamandra | G01C 21/3679 701/1 |
| 2015/0046082 A1* | 2/2015 | Okamoto | G06Q 10/10 701/454 |
| 2015/0051763 A1* | 2/2015 | Enomoto | B60L 11/1862 701/22 |
| 2015/0051774 A1* | 2/2015 | Roesch | B60W 10/06 701/22 |
| 2015/0073636 A1* | 3/2015 | Machino | G01C 21/3469 701/22 |
| 2015/0211865 A1* | 7/2015 | Krishnamurthy | G01C 21/26 701/400 |
| 2015/0226572 A1* | 8/2015 | North | G01C 21/3469 701/400 |
| 2015/0247734 A1* | 9/2015 | Okada | G01C 21/34 701/423 |
| 2015/0304406 A1* | 10/2015 | Penilla | G01C 21/26 709/203 |
| 2016/0025506 A1* | 1/2016 | Penilla | G06Q 20/18 701/430 |
| 2016/0098410 A1* | 4/2016 | Ziezold | G06F 17/30666 707/724 |
| 2016/0176307 A1* | 6/2016 | Becker | B60L 11/1816 320/109 |
| 2016/0258767 A1* | 9/2016 | Nevrekar | G01C 21/343 |

* cited by examiner

DISPLAY METHOD FOR VEHICLE

This nonprovisional application claims priority under 35 U.S.C. § 119(a) to German Patent Application No. 10 2014 205 341.2, which was filed in Germany on Mar. 21, 2014, and which is herein incorporated by reference.

BACKGROUND OF THE INVENTION

Field of the Invention

The present invention relates to a display method for a vehicle, in particular a display method for vehicles having an electric drive, for example electric vehicles or hybrid vehicles, charging stations for charging an electric charge accumulator of the vehicle being displayed with the aid of the display method.

Description of the Background Art

Display systems, for example navigation systems, are available for vehicles, for example passenger cars or trucks, in which filling stations, charging stations and other special destinations, such as shopping centers, are stored and may be marked on a map representation. In vehicles having an electric drive, in particular, it is sensible and important to display, to a driver, suitable charging stations for charging an electric energy accumulator for the electric drive, for example, on a navigation system. As electric vehicles become more widespread, however, the number of charging stations increases, so that a display of all available charging stations, for example on a map representation, may result in an extremely cluttered and confusing representation. FIG. 1 shows an example of a schematic representation of a map 10 on a navigation system of a vehicle. The vehicle is represented, for example, as arrow 11. Multiple streets 12 through 16 are furthermore shown on map 10. A planned route of vehicle 11 extends along street 14 and is therefore represented in FIG. 1 by a thicker line thickness. The upside-down triangles designate charging stations at which the electric energy accumulator of an electric vehicle may be charged. As is apparent from FIG. 1, the representation is cluttered by the large number of charging stations.

In this connection, a method for outputting information about charging stations for vehicles with electric drives is disclosed in DE 10 2010 048 258 A1. In the method, filter criteria for outputting the information about charging stations for vehicles with electric drives are detected, and charging stations are ascertained whose assigned information meets the detected filter criteria. The ascertained charging stations are output in the vehicle.

US 2009/0265099 A1 relates to a navigation aid, which has an intelligent display mode and a communication system. The navigation aid is connected to a vehicle sensor system and historical or time-based information for the purpose of reducing the number of businesses which are displayed on a map by filtering out unnecessary or less preferred services.

SUMMARY OF THE INVENTION

It is therefore an object of the present invention to provide/improve the display of charging stations, for example on a navigation system of an electric vehicle.

According to an embodiment of the present invention, a display method for a vehicle is provided. The vehicle can be, for example, an electric vehicle, a so-called battery electric vehicle (BEV) or a so-called plug-in hybrid electric vehicle (PHEV). The vehicle includes an electric drive and an electric charge accumulator for storing electric energy for the electric drive. In the exemplary method, multiple properties of multiple charging stations can be provided, which are suitable for charging the electric charge accumulator of the vehicle. Multiple filter criteria can furthermore be provided. One particular filter criterion of the multiple filter criteria can be assigned to one particular property of the multiple properties of the charging stations. In other words, multiple filter criteria can be provided, each of which may be applied to corresponding properties of the charging stations for the purpose of determining whether a charging station meets one or more of the filter criteria. The filter criteria may include, for example, filter criteria set by the manufacturer of the vehicle, or they may alternatively or additionally include user-settable filter criteria. The information relating to the charging stations, i.e., the properties of the charging stations, may be provided, for example, by a database in the vehicle, or they may be provided, for example, by an Internet service or other service provider over a mobile radio communications connection. Based on the multiple filter criteria, the multiple charging stations are filtered, and a filtered subset of charging stations is generated, in such a way that the filtered subset of charging stations has no more than a predetermined number of charging stations. In other words, the multiple filter criteria are used to filter out, from the provided charging stations, a subset which has no more than a predetermined number of charging stations. The filtered subset of charging stations is finally displayed on a display device of the vehicle. By filtering out a subset which has no more than a predetermined number of charging stations from the multiple charging stations provided, with the aid of the multiple filter criteria, a very manageable number of charging stations may be displayed on the display device of the vehicle. An uncluttered display may be achieved thereby, for example in areas having a very high density of charging stations.

According to an embodiment, a subset of filter criteria can be determined from the multiple filter criteria for the purpose of filtering the multiple charging stations in such a way that the filtered subset of charging stations has no more than the predetermined number of charging stations. The filtered subset of charging stations can include those charging stations whose properties meet the filter criteria of the subset of filter criteria. In other words, a subset of the filter criteria is selected, and the charging stations which meet the filter criteria of this subset are determined. The subset of filter criteria can be selected in such a way that the filtered subset of charging stations has no more than the predetermined number of charging stations, so that an uncluttered representation may be achieved.

According to an embodiment, a priority can be assigned to a particular criterion in each case. The priority assigned to the filter criteria is used to determine the subset of filter criteria. Filter criteria having a higher priority may include, for example, the ability to reach the charging station on the residual charge of the electric charge accumulator or a compatibility of the connection of the charging station with a charger connection of the vehicle. As a result, charging stations which are unsuitable for charging the vehicle, or which could create problems, are reliably excluded.

The priorities assigned to the filter criteria may be furthermore determined automatically with the aid of a self-learning process, based on properties of charging stations used in the past. If the user has frequently sought out, for example, a charging station in a particular location in the past or has frequently driven to charging stations of a particular provider in the past, charging stations of this type may be preferably displayed, due to a suitable assignment of priorities to corresponding filter criteria.

According to an embodiment, the subset of filter criteria can be determined as follows. A filter criterion can be first selected from the multiple filter criteria. This may be, for example, the filter criterion having the highest priority. The selected filter criterion can be assigned to the subset of filter criteria which is still empty at the beginning of this specific embodiment. A first filtered subset of charging stations can be determined with the aid of the first filter criterion. The first filtered subset of charging stations can include those charging stations whose properties meet the first filter criterion. If the first filtered subset of charging stations has more charging stations than the predetermined maximum number of charging stations, additional filter criteria can be selected to further reduce the filtered subset of charging stations. This is achieved in that the following steps are carried out for N=2, 3, 4, etc. until an Nth filtered subset of charging stations has no more than the predetermined number of charging stations. An Nth filter criterion can be selected from the multiple filter criteria, for example the filter criterion having the next higher priority, and is added to the subset of filter criteria. The Nth filtered subset of charging stations can be determined on the basis of the subset of filter criteria set up in this manner, the Nth filtered subset of charging stations including the charging stations of the (N−1)th filtered subset of charging stations whose properties meet the Nth filter criterion. In other words, additional filter criteria continue to be applied to the filtered subset of charging stations until the filtered subset of charging stations has no more than the predetermined number of charging stations. The predetermined number of charging stations may be within, for example a value range of 2 through 10. However, it may have a value of 3 or 4, for example. As a result, an uncluttered representation of charging stations may be achieved on a display device, for example, of a navigation system, in the form of a map representation having charging stations marked thereon.

In another embodiment, a user selection by a user of the vehicle is displayed on the display device after the filtered subset of charging stations is displayed, with the aid of which the user selects one of the displayed charging stations. A future operating strategy of the vehicle is set as a function of the selected charging station. The future operating strategy influences a consumption of electric energy for a future operation of the vehicle. For example, if the user has selected a charging station at a comparatively short distance to a current position of the vehicle, so that the charging station may reliably be reached on the electric charge available in the electric charge accumulator, and a substantial amount of electric charge is even expected to be still present in the charge accumulator, an operating strategy of the vehicle, for example a maximum acceleration, a maximum speed or an air conditioner and heater control, may be set to a more generous consumption. However, if the selected charging station may be reached only by operating the vehicle more sparingly, the operating strategy may be set accordingly, i.e., for example, a maximum acceleration may be limited, a maximum speed may be limited, a recuperation behavior may be added, an air conditioner or heater control may be limited and, likewise, a light control may be set in an energy-efficient manner. In a hybrid vehicle, for example, the operating strategy may additionally set the ratio between an operation of the vehicle with the aid of an internal combustion engine and an operation of the vehicle with the aid of a purely electric drive accordingly.

In a hybrid vehicle, in particular, which includes not only the electric drive but also an internal combustion engine, a previous drive strategy of the vehicle may be determined, which includes a ratio between a use of the electric drive and a use of the internal combustion engine on a previous trip segment. The multiple charging stations may be filtered as a function of the previous drive strategy determined in this manner. For example, if it is apparent from the previous drive strategy that the driver prefers an electric drive, charging stations may be preferably displayed which may be reached with the aid of an electric-only drive or only a very small share of the internal combustion engine operation. On the other hand, for example if the user has frequently utilized the maximum range of the hybrid drive using both the electric drive and the internal combustion engine drive, charging stations at a greater distance may be preferably selected and displayed.

The multiple filter criteria which may be used to limit the represented charging stations may include, for example, the following criteria. One criterion may be, for example, whether the charging station may be reached on an amount of energy currently stored in the electric charge accumulator. In electric-only vehicles, i.e., in vehicles without an internal combustion engine, this criterion usually has a very high priority for the purpose of ensuring the mobility of the vehicle. Another criterion may be, for example, whether an electric connection of the charging station matches the electric connection of the vehicle. This criterion may also have a very high priority, in particular if it is to be assumed that no corresponding adapter for converting the electric connections is present or may be procured in a short period of time. Another criterion for filtering the charging stations is, for example, whether the charging station is situated along a travel route planned for the vehicle. This may avoid having to take into account a circuitous route to charge the vehicle. One criterion may furthermore be whether the charging station is operated by a provider of a predetermined provider group or whether the charging station is operated by a particular provider. A filtering according to this criterion may be advantageous, for example, if the user collects bonus points from a particular provider or a particular provider group, or if certain price agreements have been made with a particular provider.

Another criterion may be, for example, whether the charging station provides a predetermined charging rate. The charging rate influences the time needed to charge the electric energy accumulator. A required rapid charging may possibly be ensured thereby. Another criterion relates to the energy costs of the electric energy dispensed at the charging station. This criterion makes it possible, for example, to check whether the energy costs are within a predetermined price range. A charging station which provides a high charging rate, for example, may be more expensive that a charging station having a lower charging rate. With the aid of this criterion relating to the energy costs, a user may, for example, save money by accepting longer charging times. As another filter criterion, it is possible to check whether the charging station is available at the time the vehicle is expected to reach the charging station. This may avoid waiting times at the charging station. An additional criterion may be whether predetermined facilities are available in the vicinity of the charging station, for example a shopping center, a hair salon, a restaurant, etc. As a result, the user may use the charging time, for example, to go shopping or eat a meal. As described above, another filter criterion makes it possible to check whether the charging station has already been used by the user in the past. This makes it possible to reliably display charging stations which are preferably used by the user of the vehicle. Finally, another filter criterion makes it possible to check whether a travel time to the charging station lies within a predetermined time range. On longer trips, in particular, it is advisable for the driver to take a break at intervals of a few hours, for example at intervals of two hours. With the aid of the criterion relating to the travel time to the charging station, it is possible, for example, to automatically ensure that the vehicle is recharged during these break times. A filter criterion of this type may be provided, for example, by a fatigue detection. The fatigue detection may automatically determine whether the driver of the vehicle could become tired within a predetermined future period of time. As a function thereof, the filtered subset of charging stations may be generated in such a way that it includes only the charging stations which will be reached within the future fatigue period.

According to the present invention, a display system for a vehicle is furthermore provided. The vehicle, for example, includes an electric drive and an electric charge accumulator for storing electric energy for the electric drive. The display system, for example a navigation system of the vehicle, includes an information device for providing multiple properties of multiple charging stations, which are suitable for charging the electric charge accumulator of the vehicle and for providing multiple filter criteria. One particular filter criterion of the multiple filter criteria is assigned to one particular property of the multiple properties of the charging stations. The charging stations may thus be filtered with the aid of the filter criteria. The display system furthermore includes a display device for outputting information to a user of the vehicle and a processing device which is coupled with the information device and the display device. During operation, the processing device filters the multiple charging stations, using the multiple filter criteria, to generate a filtered subset of charging stations in such a way that the filtered subset of charging stations has no more than a predetermined number of charging stations. The charging stations of the filtered subset of charging stations are displayed on the display device of the vehicle. The display system is therefore suitable for carrying out the method described above and its specific embodiments, and it therefore also has the advantages described above.

According to an embodiment, a vehicle is provided which has the display system described above. The vehicle can be, for example, an electric vehicle having only an electric drive or a hybrid vehicle having an electric drive and an internal combustion engine. With the aid of the display system described above, an uncluttered representation of charging stations for charging an electric charge accumulator for storing electric energy for the electric drive may be provided on a display device of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
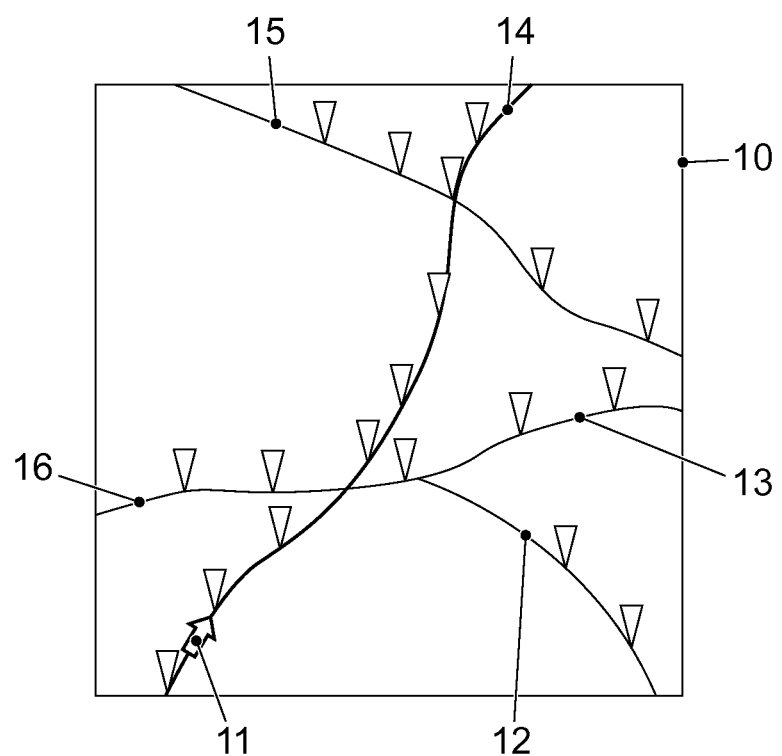
FIG. 1 shows a schematic representation of a map, on which charging stations are plotted, according to the conventional art.

Electric vehicles or hybrid vehicles which include an electric drive generally have an electric energy accumulator or charge accumulator for storing electric energy for the electric drive. The charge accumulator, for example a rechargeable battery, may usually be charged at charging stations or charging columns by supplying electric energy. However, a very high charging station density or charging column density already exists today in some areas, as illustrated, for example, in FIG. 1. A representation of this type, for example on a navigation system of the vehicle, may be perceived as cluttered and confusing. From a driver's perspective, therefore, it is desirable to display a more manageable number of charging stations. To achieve this, a method 200 is described in detail, with reference to FIG. 2, which provides a reduced selection of charging stations.

Figure 2:
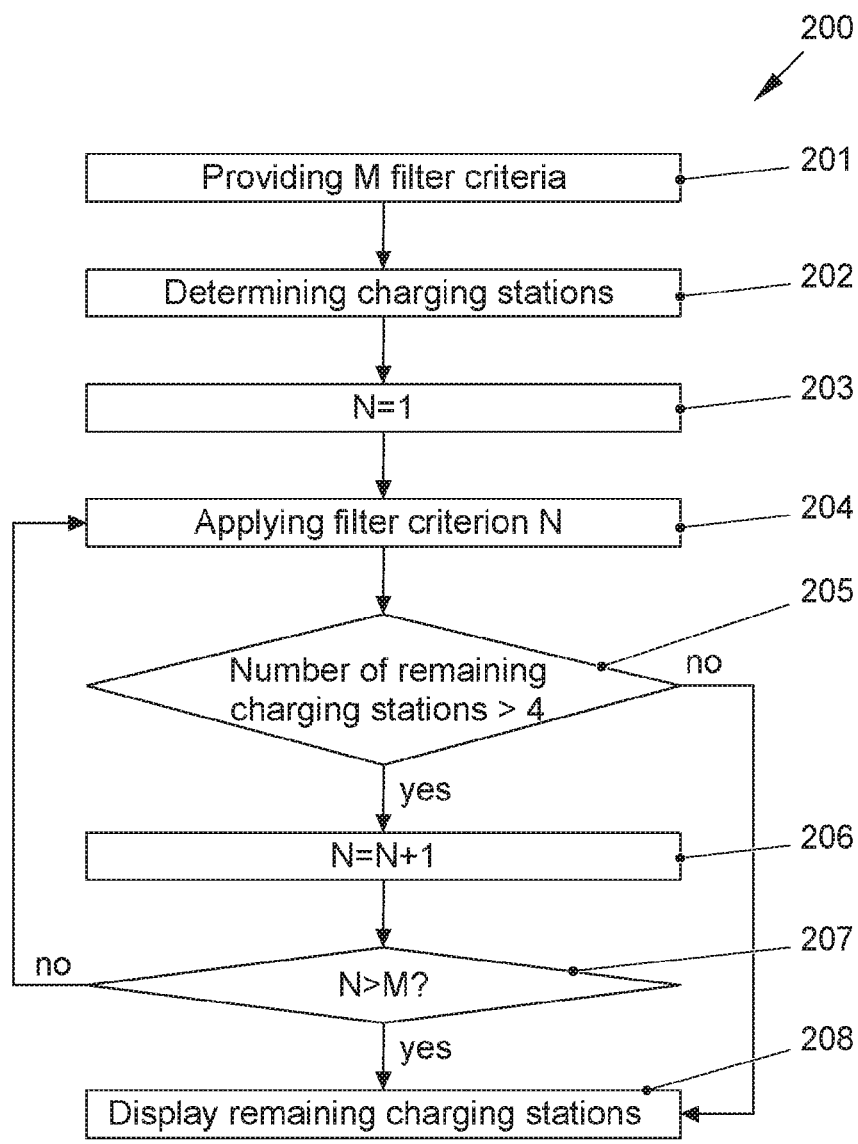
FIG. 2 shows steps of a display method according to an embodiment of the present invention.

In step 201 of method 200 in FIG. 2, multiple filter criteria are provided, for example M filter criteria, where M is, for example, in a range from 5 to 10. Different filter criteria will be described later on, with reference to FIG. 3. In step 202, charging stations are determined, for example within a certain geographic area of the vehicle. Alternatively, all charging stations may also be considered in step 202, for example from a database. Each of the charging stations has multiple properties which may be evaluated using the multiple filter criteria. In other words, the filter criteria may be used to determine whether or not a particular charging station meets the corresponding criterion. To successively reduce the number of charging stations, an iterative method is proposed in FIG. 2, in which different filter criteria of the M filter criteria are consecutively applied. The filter criteria may be provided, for example, on a prioritized and numbered list. The filter criteria are therefore addressed consecutively by their number or position on the list. For this purpose, a control variable N of the iterative method is set to one in step 203. Filter criterion N is applied to the charging stations in step 204. In other words, each charging station is checked to see whether the corresponding charging station meets filter criterion N. All charging stations which meet filter criterion N form a filtered subset of the charging stations. In step 205, it is checked whether the number of charging stations in the subset filtered in this manner has reached or fallen below the maximum value of four. If this is the case, the method continues in step 208, and the charging stations of the filtered subset are displayed, for example, on a map representation in a navigation system of the vehicle. However, if the number of charging stations in the filtered subset is greater than the desired maximum number of four, the method is continued in step 206, wherein control variable N is increased by one. In step 207, it is checked whether all M filter criteria have been applied. If all M filter criteria have been applied, i.e., if N is greater than M, a further filtering is not possible due to the lack of additional filter criteria, and the filtered subset of charging stations is output to the user even though it may contain more than four charging stations. However, an adequate number of filter criteria is usually defined, so that the filtered subset of charging stations may be further filtered and thus reduced in the method in step 204 by applying the next filter criterion. In step 205, in turn, it is checked whether the number of remaining charging stations has now reached the maximum value of four. If it has, the remaining charging stations are displayed; if not, the next filter criterion is applied. The number of charging stations is thus increasingly reduced by successively applying the different filter criteria until only four or fewer charging stations remain, which are then displayed, for example, on the navigation system.

Figure 3:
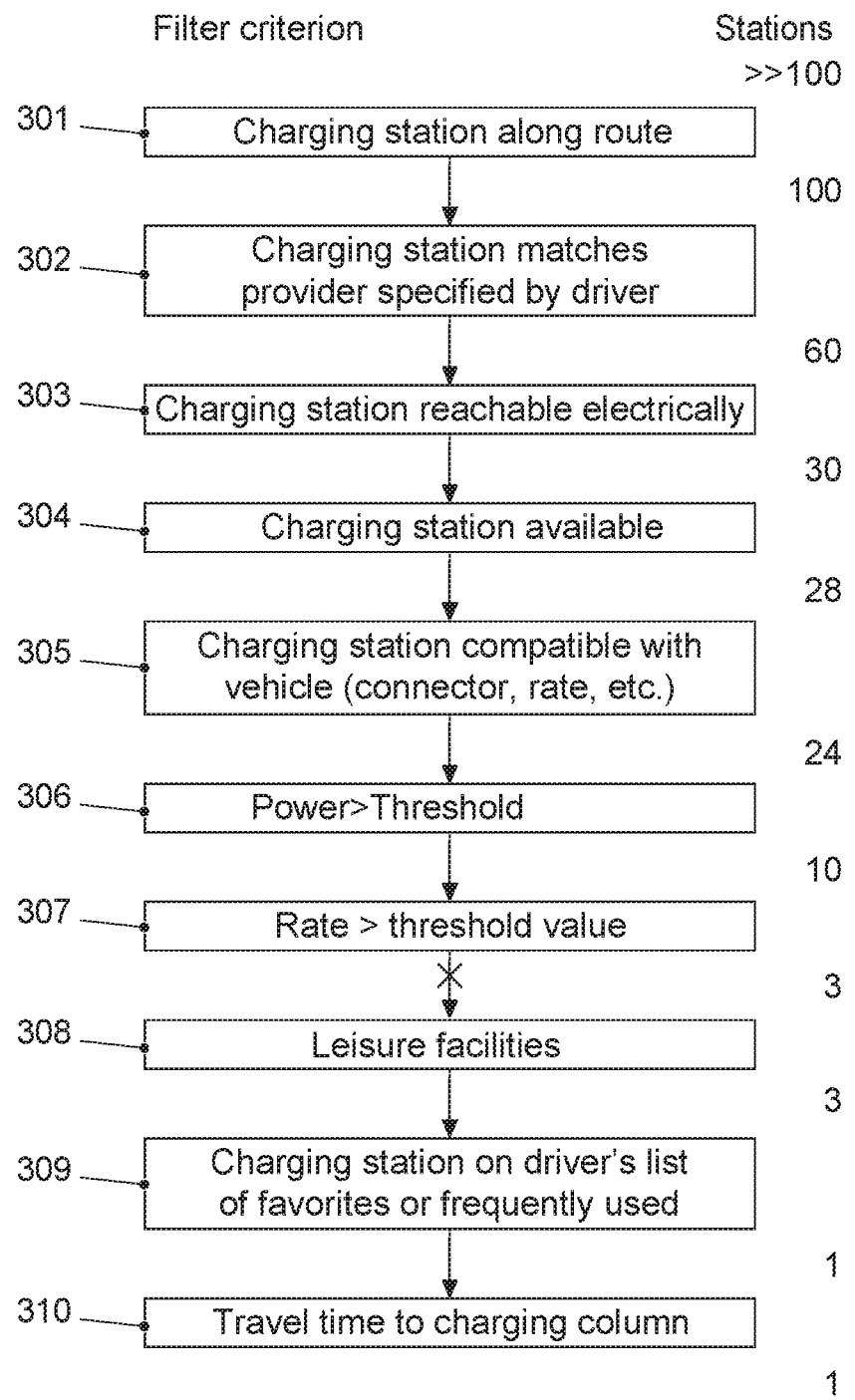
FIG. 3 shows a schematic representation of how a number of displaying charging stations may be reduced with the aid of different filter criteria, according to an embodiment of the present invention.

FIG. 3 shows the method described with reference to FIG. 2 on the basis of concrete filter criteria. At the beginning, for example, far more than one hundred charging stations are provided, for example from a database. In step 301, the charging stations are now filtered out, which are located along the route, which is planned, for example, by the navigation system of the vehicle. For example, only one hundred charging stations meet this criterion. In step 302, the charging stations which are operated by the provider specified by the driver are filtered out of these hundred charging stations. These are, for example, sixty charging stations, so that the number of charging stations of the filtered subset of charging stations has been reduced to sixty. In step 303, the charging stations which may be reached by an electric-only drive are filtered out. These are, for example, only thirty charging stations. In step 304, it is checked whether these thirty charging stations are expected to be available when the vehicle reaches the charging station. In the present example, for example, two of the thirty charging stations are expected to be unavailable, so that the remaining number of charging stations is only twenty-eight. In step 305, it is checked whether the charging stations are compatible with the vehicle, i.e., which charging station has a matching connector and a charging rate or voltage suitable for the charging capabilities of the battery of the vehicle. After this filter criterion has been applied, twenty-four charging stations remain in the filtered subset of charging stations. To be able to carry out the charging operation quickly enough, the charging stations which provide a certain minimum charging rate to permit a desired charging speed to be reached are filtered out in step 306. Only ten charging stations meet this additional criterion. In step 307, the energy costs of these ten charging stations are compared with a threshold value, and only those charging stations which have lower energy costs than the threshold value remain in the filtered subset of charging stations. After this filter criterion has been applied, three charging stations remain in the filtered subset of charging stations. At this point, the method may be stopped, since the number of charging stations to be displayed has dropped below the desired maximum number. The remaining charging stations are displayed, for example, on a map of a navigation system, as shown, for example, in FIG. 4. The position of the local vehicle is represented by arrow 11 in FIG. 4, and the charging stations which were filtered out in step 307 are represented by three markings 401 through 403 along planned route 14. The remaining reference numerals designate similar components as the representation in FIG. 1 according to the prior art.

In FIG. 3, additional filter criteria are displayed, which would be applied in steps 308 through 310 if the number of stations had not yet reached or dropped below the maximum desired number of stations to be displayed. For example, the charging stations which have a leisure facility in its immediate surroundings may be filtered out in step 308, for example, a shopping center, an amusement park, a nearby recreation area, a certain restaurant or the like. In step 309, a filter criterion may furthermore be applied, which compares the remaining charging stations with charging stations, for example, on a list of favorites of the driver or frequently used charging stations and leaves only those charging stations in the filtered subset of charging stations which are provided, for example, on the list of favorites or which have at least been approached previously. Finally, it may be determined in step 310 which of the remaining charging stations is expected to be reached after a certain travel time. As a result, for example, breaks which are already planned for certain travel times may be used for charging the vehicle.

Figure 4:
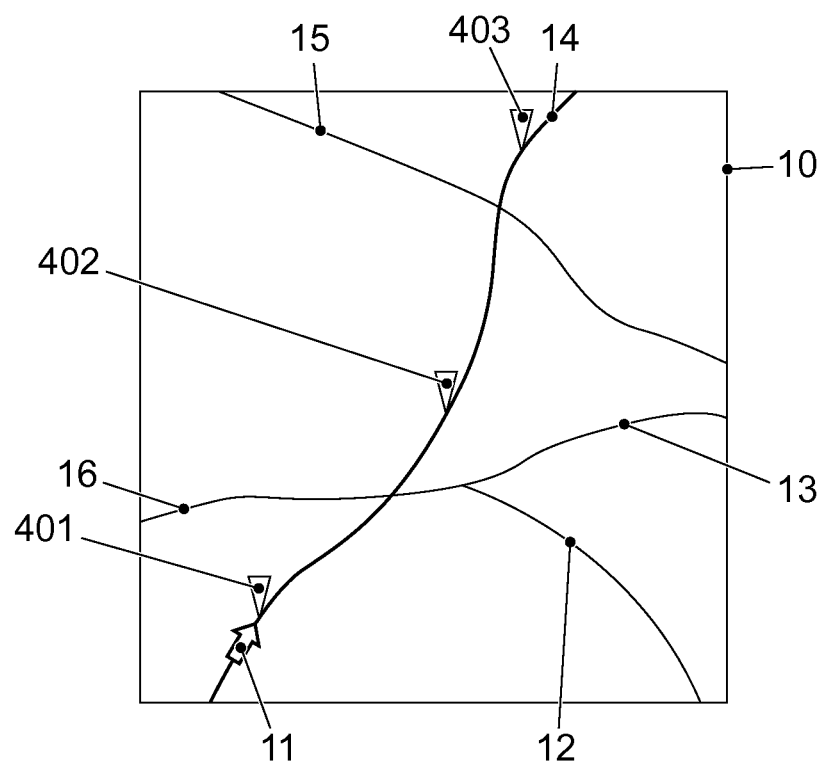
FIG. 4 shows a schematic representation of a map, on which charging stations are plotted, according to an embodiment of the present invention.
Figure 5:
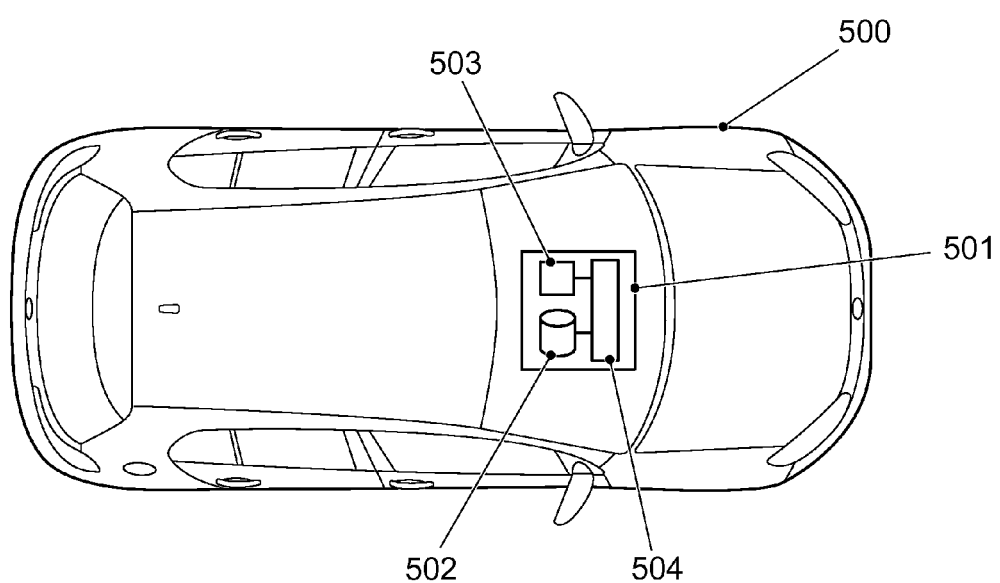
FIG. 5 shows vehicle having a display system according to an embodiment of the present invention.

FIG. 5 shows a display system 501 for a vehicle 500. Vehicle 500 includes, for example, an electric drive and an electric charge accumulator for storing electric energy for the electric drive. Display system 501 includes an information device 502, for example a database or a connection to a database, which provides multiple properties of multiple charging stations which are suitable for charging electric charge accumulators for vehicles. Information device 502 furthermore provides multiple filter criteria. One particular filter criterion of the multiple filter criteria is assigned to one particular property of the multiple properties of the charging station and may therefore be used to filter the charging stations. Display system 501 furthermore includes a display device 503 for outputting information to a user of vehicle 500. Display device 503 may include, for example, a screen of a navigation system, on which, as illustrated in FIG. 4, a schematic map representation may be displayed, which has the position of vehicle 500 and the position of selected charging stations 401 through 403. Display system 501 finally includes a processing device 504, which is coupled with information device 502 and display device 503. Processing device 504 is able to filter the multiple charging stations, using the multiple filter criteria, to generate a filtered subset of charging stations in such a way that the filtered subset of charging stations has no more than a predetermined number of charging stations, for example four charging stations. Processing device 504 is furthermore designed to display the charging stations of the filtered subset of charging stations on display device 503.

For example, the quantity of all charging stations located along route 14 is filtered one by one with the aid of display system 501. The sequence of the filters is determined, for example, from the relevance for the user of vehicle 500. In an electric vehicle with an electric-only drive, for example, the most important filter criterion will be the criterion that the charging station may be reached at all on the current state of charge of the charge accumulator. Once the number of charging stations has been reduced to a previously specified value of, for example, three or four, the filtering stops and the charging stations are displayed to the driver for selection. Possible filter criteria are, for example, whether the charging station may be reached on the current state of charge; whether the charging station is operated, for example, by a supplier selected by the driver; whether the charging station meets certain criteria relating to charging rate, energy costs and availability; or whether leisure facilities are present in the area of the charging station. The application of the filter criteria may also have a self-learning design, so that they are preferably filtered according to charging stations which the driver frequently approaches.

Due to the reduced number of output charging stations, a less cluttered representation may be achieved for the driver and a more effective route planning may be implemented. Moreover, an operating strategy for the vehicle may be improved if the driver specifies at an early point the charging stations where he plans to charge the vehicle based on the reduced number of represented charging stations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display method for a vehicle, the method comprising:
   providing multiple properties of multiple charging stations that are located along a route calculated by a navigation system of the vehicle and which are suitable for charging an electric charge accumulator of the vehicle, the multiple properties having been stored on a database;
   providing multiple filter criteria, a filter criterion of the multiple filter criteria being assigned to a property of the multiple properties of the charging stations, wherein a priority is assigned to each particular filter criterion of the multiple filter criteria;
   filtering, using a processing device in the vehicle, the multiple charging stations using the multiple filter criteria for generating a filtered subset of charging stations such that the filtered subset of charging stations has a predetermined number of charging stations, said filtering comprising individually and sequentially applying each of the multiple filter criteria in an order according to the priorities assigned to each particular filter criterion; and
   displaying the filtered subset of charging stations on a map of the navigation system on a display device of the vehicle.

2. The method according to claim 1, wherein the filtering of the multiple charging stations, comprises determining a subset of filter criteria from the multiple filter criteria such that the filtered subset of charging stations has no more than the predetermined number of charging stations, wherein the filtered subset of charging stations includes those charging stations of the multiple charging stations whose properties meet the filter criteria of the subset of filter criteria.

3. The method according to claim 1, wherein the priorities assigned to the filter criteria are automatically determined with the aid of a self-learning process, based on properties of charging stations used in the past.

4. The method according to claim 2, wherein the determination of the subset of filter criteria comprises:
   selecting a first filter criterion from the multiple filter criteria;
   assigning the selected filter criterion to the subset of filter criteria;
   determining a first filtered subset of charging stations, the first filtered subset of charging stations including those charging stations of the multiple charging stations whose properties meet the first filter criterion; and carrying out the following steps for N=2, 3, 4, etc., until an Nth filtered subset of charging stations has no more than the predetermined number of charging stations:
   selecting an Nth filter criterion from the multiple filter criteria;
   adding the selected Nth filter criterion to the subset of filter criteria; and
   determining the Nth filtered subset of charging stations, the Nth filtered subset of charging stations including those charging stations of the (N−1)th filtered subset of charging stations whose properties meet the Nth filter criterion.

5. The method according to claim 1, wherein the predetermined number of charging stations is a value in the range of 2 through 10.

6. The method according to claim 1, further comprising:
   detecting a user selection by a user of the vehicle via which the user selects one of the displayed charging stations; and
   setting a future operating strategy of the vehicle as a function of the selected charging station, the future operating strategy influencing a consumption of electric energy for a future operation of the vehicle.

7. The method according to claim 1, further comprising:
   determining a previous drive strategy of the vehicle, which includes a ratio between a use of an electric drive of the vehicle and a use of an internal combustion engine of the vehicle on a previous trip segment; and
   filtering the multiple charging stations as a function of the previous drive strategy.

8. The method according to claim 1, wherein the multiple filter criteria have at least one criterion that includes:
   whether the charging station is reachable on an amount of energy currently stored in the electric energy accumulator;
   whether an electric connection of the charging station matches an electric connection of the vehicle;
   whether the charging station is situated along a travel route planned for the vehicle;
   whether the charging station is operated by a provider of a predetermined provider group;
   whether the charging station provides a predetermined charging rate;
   whether energy costs of the electric energy dispensed at the charging station are within a predetermined price range;
   whether the charging station is available when the vehicle is expected to reach the charging station;
   whether predetermined facilities are present in the surroundings of the charging station;
   whether the charging station was previously used by the vehicle in the past; or
   whether a travel time to the charging station is within a predetermined time range.

9. The method according to claim 1, wherein the predetermined number of charging stations is a value of 3 or 4.

10. The method according to claim 1, wherein the multiple filter criteria include:
    whether the charging station is reachable on an amount of energy currently stored in the electric energy accumulator;
    whether an electric connection of the charging station matches an electric connection of the vehicle;
    whether the charging station is situated along a travel route planned for the vehicle;
    whether the charging station is operated by a provider of a predetermined provider group;

whether the charging station provides a predetermined charging rate;

whether energy costs of the electric energy dispensed at the charging station are within a predetermined price range;

whether the charging station is available when the vehicle is expected to reach the charging station;

whether predetermined facilities are present in the surroundings of the charging station;

whether the charging station was previously used by the vehicle in the past; and whether a travel time to the charging station is within a predetermined time range.

11. The method according to claim 1, wherein said filtering comprises applying a particular filter criterion having a highest priority first.

12. The method according to claim 1, further comprising, upon a user selecting a charging station from the filtered subset of charging stations, setting a future operating strategy of the vehicle.

13. The method according to claim 12, wherein said future operating strategy comprises settings for determining energy consumption of vehicle, the settings including maximum vehicle acceleration, maximum vehicle speed, recuperation behavior, or a ratio between operation of the vehicle with aid of an internal combustion engine and operation of vehicle with the aid of only an electric drive.

14. The method according to claim 12, wherein said future operating strategy comprising settings for determining energy consumption of vehicle, the settings including maximum vehicle acceleration, maximum vehicle speed, recuperation behavior, and a ratio between operation of the vehicle with aid of an internal combustion engine and operation of vehicle with the aid of only an electric drive.

15. A display system for a vehicle, the vehicle including an electric drive and an electric charge accumulator for storing electric energy for the electric drive, the display system including:

an information device to provide multiple properties of multiple charging stations that are located along a route calculated by a navigation system of the vehicle and that are suitable for charging the electric charge accumulator of the vehicle and to provide multiple filter criteria, a filter criterion of the multiple filter criteria being assigned to a property of the multiple properties of the charging stations, the multiple properties having been stored on a database, wherein a priority is assigned to each particular filter criterion of the multiple filter criteria;

a display device to output information to a user of the vehicle; and a processor that is coupled with the information device of the display device, the processing device adapted to:

to filter the multiple charging stations, using the multiple filter criteria, for generating a filtered subset of charging stations such that the filtered subset of charging stations has no more than a predetermined number of charging stations, said using the multiple filter criteria comprising individually and sequentially applying each of the multiple filter criteria in an order according to the priorities assigned to each particular filter criterion; and to display the charging stations of the filtered subset of charging stations on the display device of the vehicle.

16. A display method for a vehicle, the method comprising:

providing multiple properties of multiple charging stations that are located along a route calculated by a navigation system of the vehicle and which are suitable for charging an electric charge accumulator of the vehicle, the multiple properties having been stored on a database;

providing multiple filter criteria, a filter criterion of the multiple filter criteria being assigned to a property of the multiple properties of the charging stations;

filtering, using a processing device in the vehicle, the multiple charging stations using the multiple filter criteria for generating a filtered subset of charging stations such that the filtered subset of charging stations has a predetermined number of charging stations, said filtering comprising individually and sequentially applying each of the multiple filter criteria;

displaying the filtered subset of charging stations on a map of the navigation system on a display device of the vehicle; and upon a user selecting a charging station from the filtered subset of charging stations, setting a future operating strategy of the vehicle, wherein said future operating strategy comprising settings for determining energy consumption of vehicle, the settings including maximum vehicle acceleration, maximum vehicle speed, recuperation behavior, and a ratio between operation of the vehicle with aid of an internal combustion engine and operation of vehicle with the aid of only an electric drive.

* * * * *